United States Patent
Belpaire et al.

(10) Patent No.: US 10,328,775 B2
(45) Date of Patent: Jun. 25, 2019

(54) REINFORCING ELEMENT FOR A CLOSED SECTION AND MANUFACTURING METHOD

(71) Applicant: SIKA TECHNOLOGY AG, Baar (CH)

(72) Inventors: Vincent Belpaire, Uccle (BE); Laurent Ory, Dietikon (CH); Stephan Niggemann, Hannover (DE)

(73) Assignee: SIKA TECHNOLOGY AG, Baar (CH)

( * ) Notice: Subject to any disclaimer, the term of this patent is extended or adjusted under 35 U.S.C. 154(b) by 646 days.

(21) Appl. No.: 14/761,872

(22) PCT Filed: Jan. 16, 2014

(86) PCT No.: PCT/EP2014/050828
§ 371 (c)(1),
(2) Date: Jul. 17, 2015

(87) PCT Pub. No.: WO2014/111480
PCT Pub. Date: Jul. 24, 2014

(65) Prior Publication Data
US 2015/0352930 A1    Dec. 10, 2015

(30) Foreign Application Priority Data
Jan. 18, 2013   (EP) .................................... 13151903

(51) Int. Cl.
*B60J 5/04* (2006.01)
*C09J 5/00* (2006.01)
(Continued)

(52) U.S. Cl.
CPC ........... *B60J 5/0451* (2013.01); *B29C 44/128* (2013.01); *B29C 44/18* (2013.01); *B60J 5/0481* (2013.01);
(Continued)

(58) Field of Classification Search
CPC ...... B29C 44/128; B29C 44/18; B60J 5/0451; B60J 5/0481; B62D 29/002; C09J 5/00;
(Continued)

(56) References Cited

U.S. PATENT DOCUMENTS 8,765,219 B2   7/2014 Nakanishi et al.
2004/0026960 A1   2/2004 Czaplicki et al.
(Continued)

FOREIGN PATENT DOCUMENTS

CN   1205923 A   1/1999
EP   2463180 A1   6/2012
(Continued)

OTHER PUBLICATIONS

International Search Report (in English and German) and Written Opinion of the International Searching Authority (in German) for PCT/EP2013/070313, dated Oct. 30, 2013; ISA/EP.
(Continued)

Primary Examiner — Yan Lan
(74) Attorney, Agent, or Firm — Oliff PLC

(57) ABSTRACT

An exemplary reinforcing element (104) may be configured to be received within a longitudinally extending cavity (C) defined by a structure (102). The reinforcing element may include a base portion (106) having a bonding material (108, 160) applied thereon, and a member (110, 150) selectively secured to the base portion and configured to selectively extend away from the base portion when the reinforcing element is received within the cavity. Accordingly, the reinforcing element may define a first length (L1) when the member is in a first position with respect to the base portion, and a second length (L1+L2) when the member is in a second position extending away from the base portion, the second length being greater than the first length. The selectively extending arrangement of the reinforcing element may
(Continued)

generally allow improved ease and accuracy of installing the reinforcing element within a generally closed structure.

12 Claims, 11 Drawing Sheets

(51) Int. Cl.
 *E05D 5/02* (2006.01)
 *B29C 44/18* (2006.01)
 *B62D 29/00* (2006.01)
 *B29C 44/12* (2006.01)

(52) U.S. Cl.
 CPC .............. *B62D 29/002* (2013.01); *C09J 5/00* (2013.01); *E05D 5/02* (2013.01); *Y10T 16/52* (2015.01); *Y10T 16/554* (2015.01); *Y10T 156/10* (2015.01); *Y10T 428/13* (2015.01); *Y10T 428/24025* (2015.01)

(58) Field of Classification Search
 CPC .......... E05D 5/02; Y10T 156/10; Y10T 16/52; Y10T 16/554; Y10T 428/13; Y10T 428/24025
 See application file for complete search history.

(56) References Cited

U.S. PATENT DOCUMENTS

| | | | |
|---|---|---|---|
| 2008/0292900 A1* | 11/2008 | Nakanishi | B29C 44/1242 428/613 |
| 2010/0092733 A1 | 4/2010 | Blank et al. | |

FOREIGN PATENT DOCUMENTS

| | | |
|---|---|---|
| JP | S64-069308 A | 3/1989 |
| JP | 2001-199362 A | 7/2001 |
| JP | 2004-341199 A | 12/2004 |
| JP | 2009001005 A | 1/2009 |
| JP | 2011-529818 A | 12/2011 |
| JP | 2012-121563 A | 6/2012 |
| WO | WO-2008077944 A1 | 7/2008 |
| WO | WO-2010014681 A2 | 2/2010 |
| WO | 2011/053773 A2 | 5/2011 |

OTHER PUBLICATIONS

Office Action (Notification of the First Office Action) dated Nov. 10, 2016, by the Chinese Patent Office in corresponding Chinese Patent Application No. 201480004456.3, and an English Translation of the Office Action. (11 pages).

Dec. 5, 2017 Office Action issued in Japanese Patent Application No. 2015-553078.

\* cited by examiner

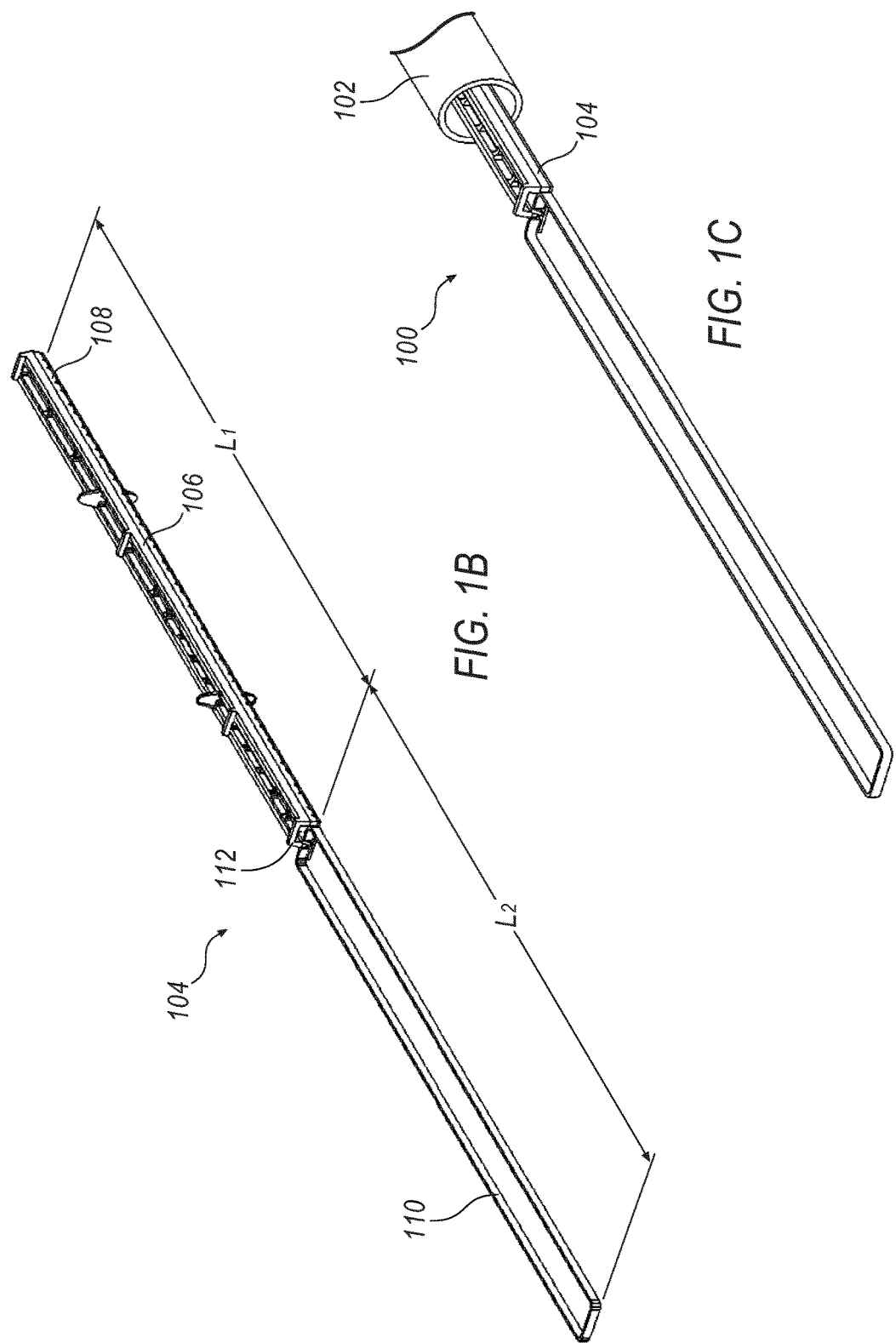

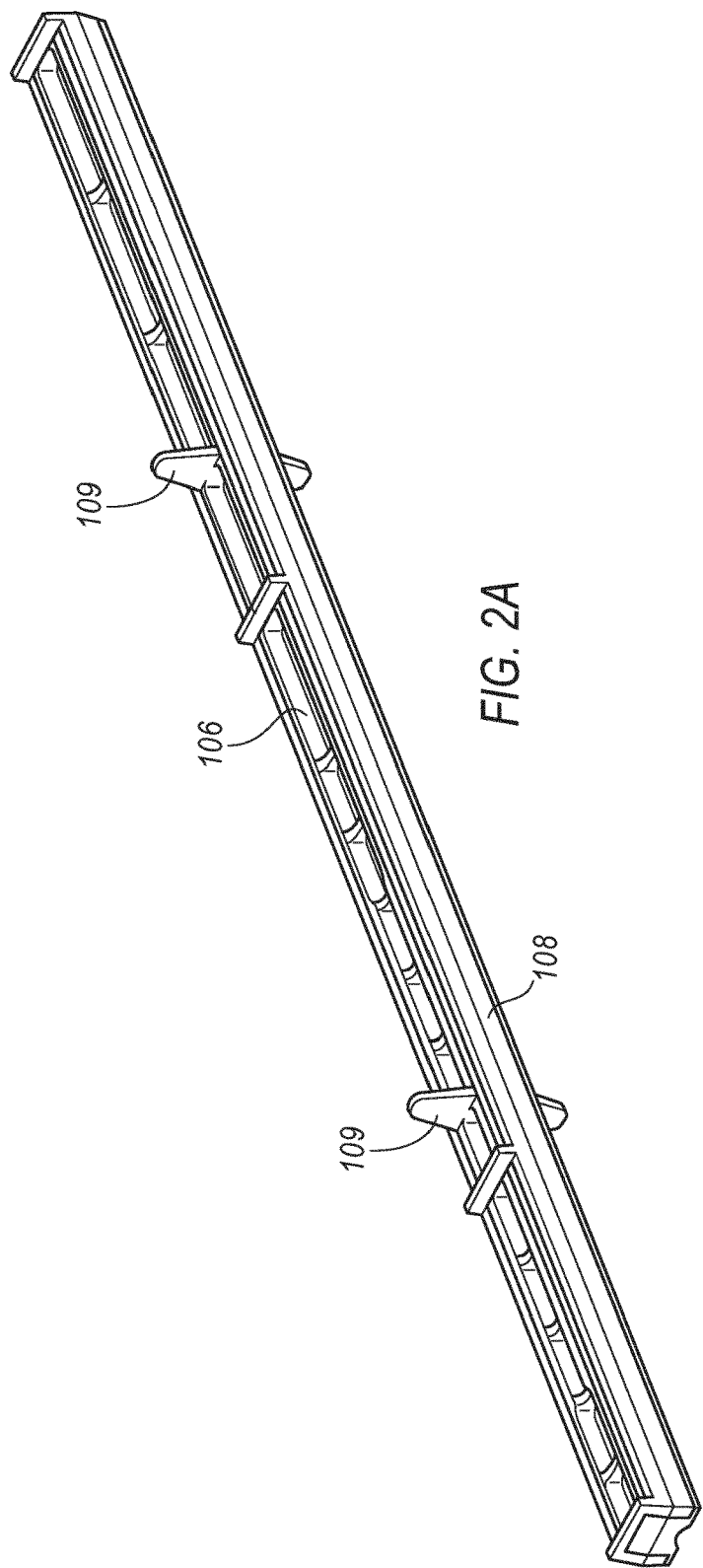

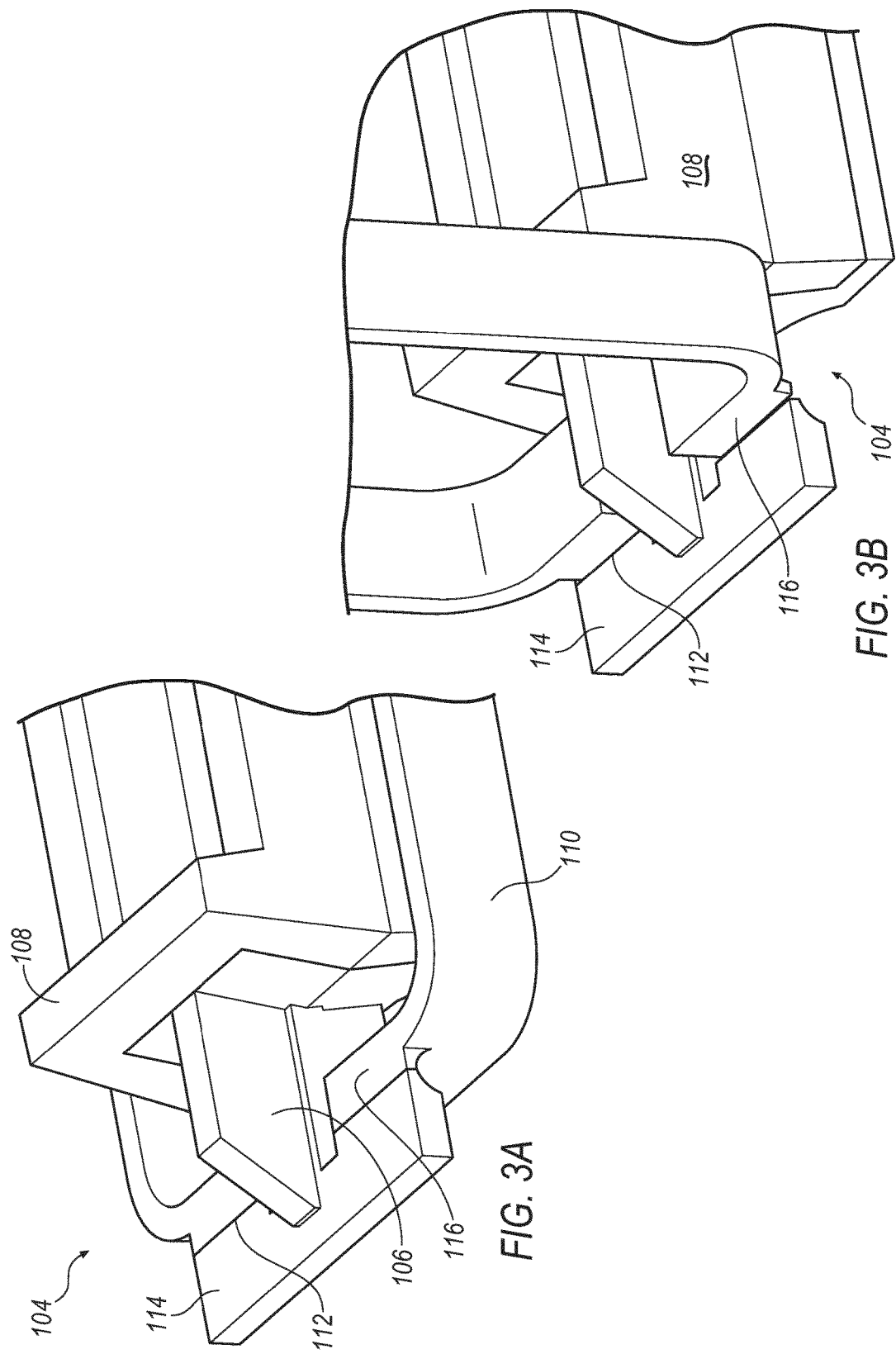

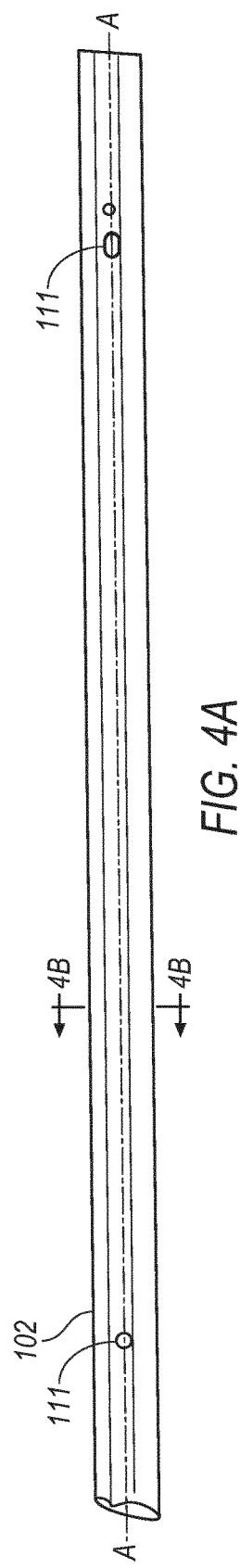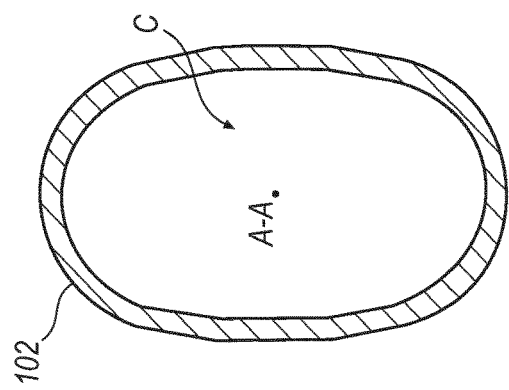
FIG. 4A
FIG. 4B

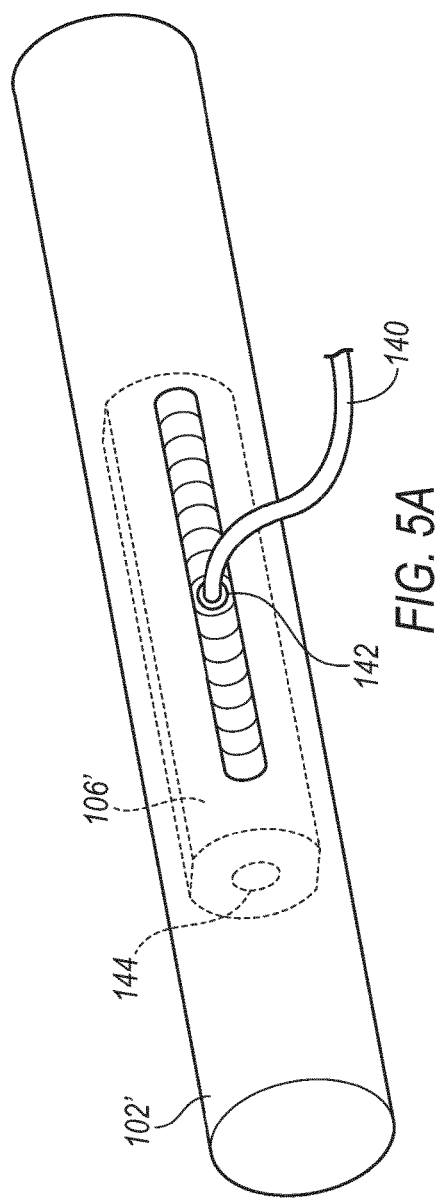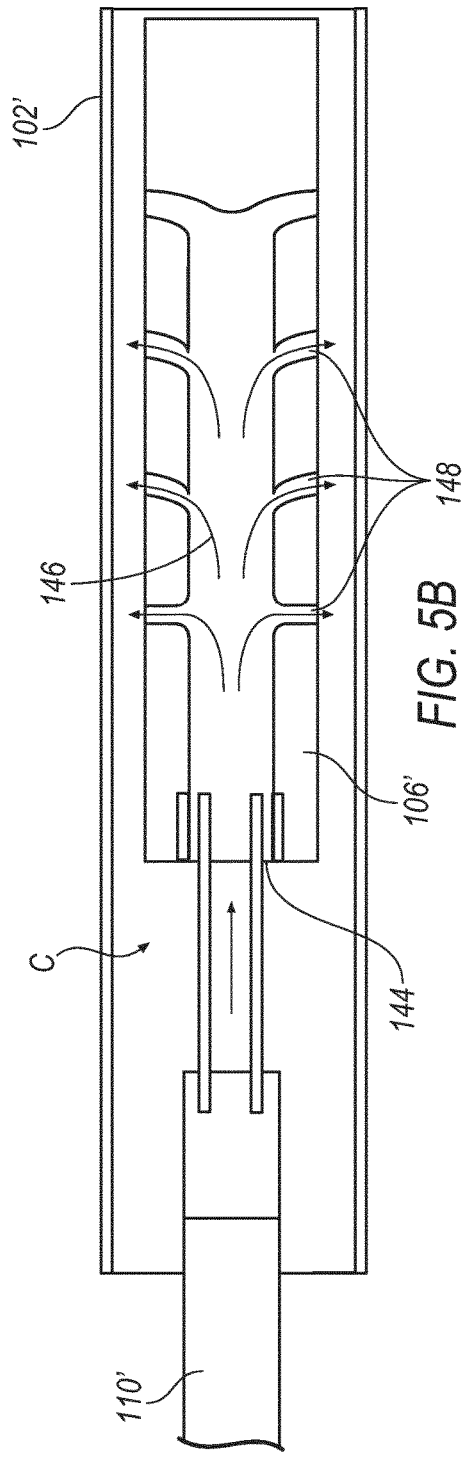

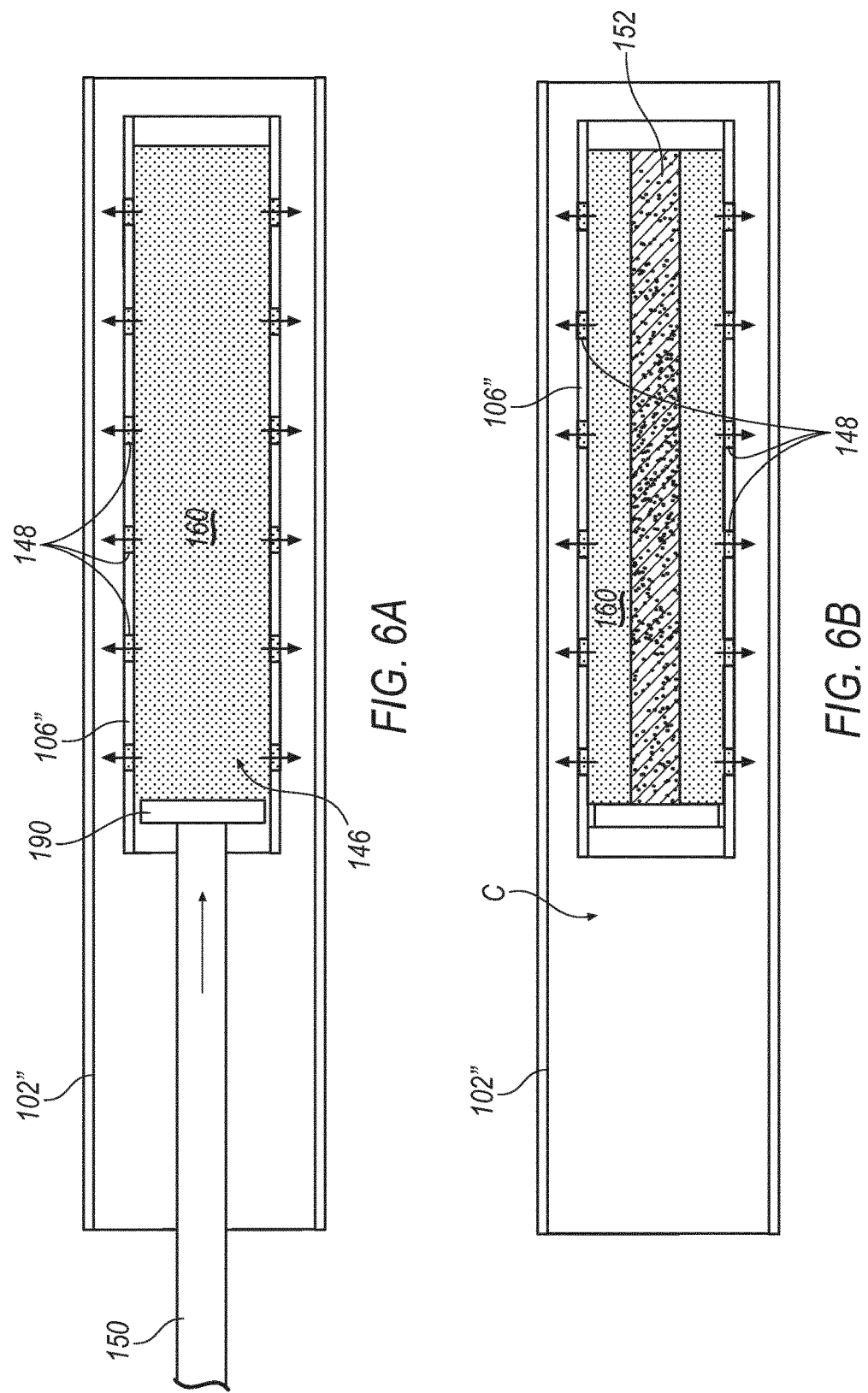

REINFORCING ELEMENT FOR A CLOSED SECTION AND MANUFACTURING METHOD

CROSS REFERENCE TO RELATED APPLICATIONS

This application is a U.S. National Phase Application under 35 U.S.C. 371 of International Application No. PCT/EP2014/050828 filed on Jan. 16, 2014 and published in English as WO 2014/111480 on Jul. 24, 2014. This application is based on and claims the benefit of priority from European Patent Application No. 13151903.5 filed Jan. 18, 2013. The entire disclosures of all of the above applications are incorporated herein by reference.

BACKGROUND

Panels for vehicle applications, e.g., door panels, are typically relatively thin in order to meet vehicle weight requirements and allow the panels to be shaped as may be desired for aesthetic and manufacturing reasons. The size and generally flat shape typical of these panels makes them susceptible to deformation, and require reinforcement in order to provide appropriate occupant protection, e.g., during a collision.

Accordingly, vehicle panels are therefore often reinforced using additional structural pieces such as a brace or reinforcement. Some known braces include a component formed with a generally open section, thereby allowing installation of additional reinforcing elements therein. The open section is generally employed in order to allow installation and proper positioning of the additional reinforcing elements, especially where expandable materials or adhesives are employed to permanently retain the reinforcing element within the open section.

In other approaches, the brace is formed with a more closed section, however this often prevents assembly of additional reinforcing elements within the section since access is restricted, thereby rendering such assembly impractical, especially in a mass manufacturing environment.

Accordingly, there is a need for an improved reinforced structure that provides adequate stiffness while minimizing the above difficulties.

SUMMARY

An exemplary reinforcing element may be configured to be received within a longitudinally extending cavity defined by a structure. The reinforcing element may include a base portion having a bonding material applied thereon, and a member selectively secured to the base portion and configured to selectively extend away from the base portion when the expandable reinforcer is received within the cavity. Accordingly, the reinforcing element may define a first length when the member is in a first position with respect to the base portion, and a second length when the member is in a second position extending away from the base portion, the second length being greater than the first length. The selectively extending arrangement of the expandable reinforcement may generally allow improved ease and accuracy of installing the expandable reinforcement within a generally closed structure.

Exemplary methods are also disclosed, which may include providing a base portion having a bonding material applied thereon, and securing a member to the base portion. The member may be configured to selectively extend away from the base portion when the reinforcing element is received within the cavity. Accordingly, the reinforcing element may generally define a first length when the member is in a first position with respect to the base portion, and a second length when the member is in a second position extending away from the base portion, the second length being greater than the first length.

BRIEF DESCRIPTION OF THE DRAWINGS

Referring now to the drawings, exemplary illustrations are shown in detail. Although the drawings represent some examples, the drawings are not necessarily to scale and certain features may be exaggerated, removed, or partially sectioned to better illustrate and explain the present invention. Further, the exemplary illustrations set forth herein are not intended to be exhaustive or otherwise limit or restrict the claims to the precise forms and configurations shown in the drawings and disclosed in the following detailed description:

FIG. 1B is a perspective view of the reinforcing element of FIG. 1A in a second or extended position, according to an exemplary illustration;

FIG. 1C is a perspective view of the reinforcing element of FIGS. 1A and 1B during insertion into a structure, according to an exemplary illustration;

FIG. 2A is a perspective view of an exemplary base portion of a reinforcing element, according to an exemplary illustration;

FIG. 3A is an enlarged perspective view of an exemplary hinged reinforcing element, according to an exemplary illustration;

FIG. 3B is an enlarged perspective view of the exemplary hinged reinforcing element of FIG. 3A with a member rotated away from a first or aligned position as shown in FIG. 3A, according to an exemplary illustration;

FIG. 4A is a perspective view of an exemplary structure defining a cavity for receiving a reinforcing element, according to an exemplary illustration;

FIG. 4B is a section view of the exemplary structure of FIG. 4A, according to an exemplary illustration;

FIG. 5A is a perspective view of an exemplary reinforcing element, according to an exemplary illustration;

FIG. 5B is a partial cutaway view an exemplary reinforcing element, according to an exemplary illustration;

FIG. 6A is a partial cutaway view of an exemplary reinforcing element, according to an exemplary illustration;

FIG. 6B is a partial cutaway view of an exemplary reinforcing element, according to an exemplary illustration.

DETAILED DESCRIPTION

Figure 1A:
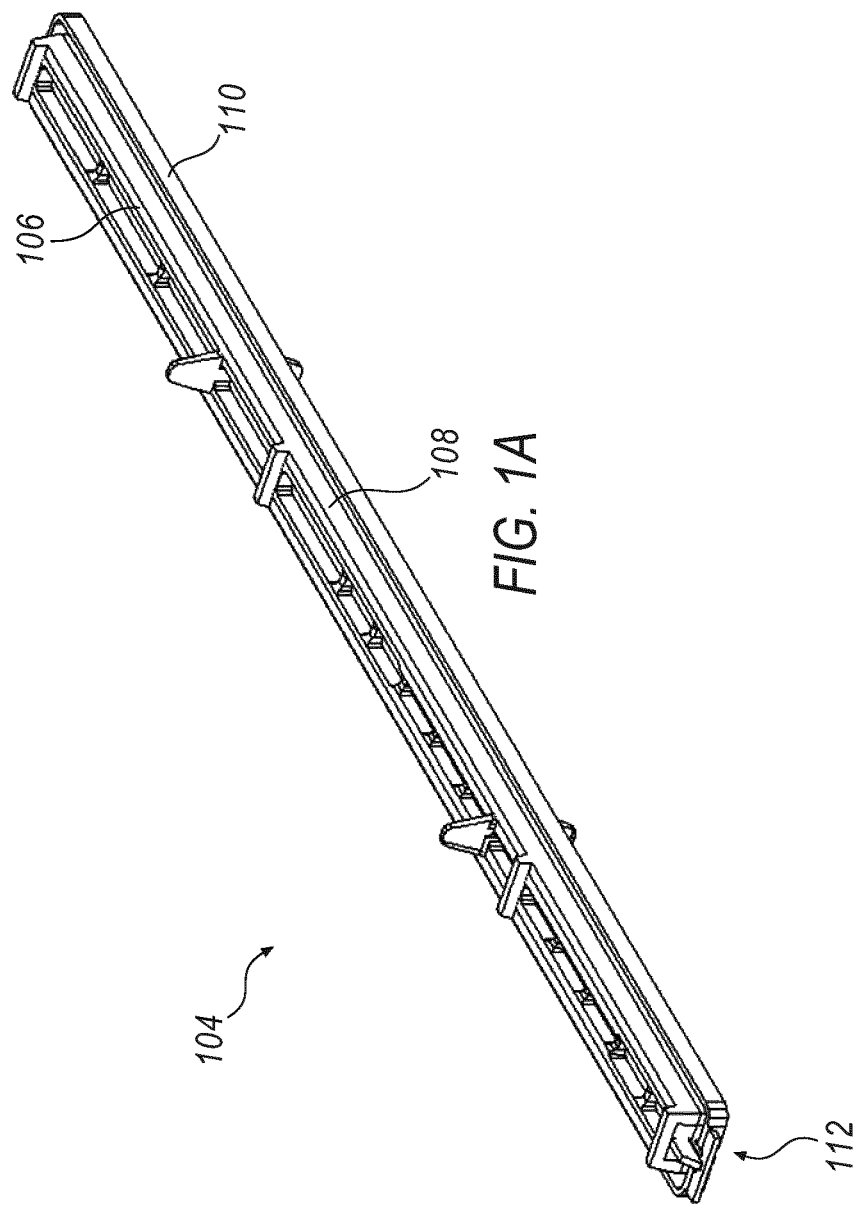
FIG. 1A is a perspective view of a reinforcing element in a first or retracted position, according to an exemplary illustration.

Turning now to FIGS. 1A-1D and 2A, 2B, 3A-3C, 4A and 4B, a structural assembly 100 is illustrated, according to an exemplary illustration. Structural assembly 100 may include a structure 102 defining an elongated or longitudinally extending cavity C. The longitudinally extending cavity C may generally be closed such that the structure of 100 is open only at one or both opposing ends of the elongated structure 102. Nevertheless, as will be described further below, certain features may be provided within the structure 102, e.g., apertures or openings between the ends of the structure 102 to allow insertion and/or installation of a base portion 106.

Structural assembly 100 may also include a reinforcing element 104. Reinforcing element 104 may generally be configured to be received within the cavity C of the structure 102. The reinforcing element 104 may generally include a base portion 106 and a member 110 selectively secured to the base portion 106. In one exemplary illustration, the member 110 is selectively removable from the base portion 106 to allow selective movement of the member 110 with respect to the base portion. In another example the member 110 is generally permanently secured to the base portion 106, but is still selectively moveable with respect to the base portion 106, e.g., by pivoting with respect to the base portion 106.

The base portion 106 may have a bonding material 108 that is applied to or secured to the base portion 106. Exemplary bonding materials may include, merely as examples, materials that generally expand and/or cure under application of heat, or adhesives, as will be described further below. The member 110 may be secured to the base portion and generally be configured to selectively extend away from the base portion 106 when the reinforcing element 104 is received within the cavity C. In one exemplary approach, the reinforcing element 104 defines a first length $L_1$ when the member is a first position with respect to the base portion 106, and a second length (represented by lengths $L_1$ and $L_2$ in combination) when the member is a second position extending away from the base portion 106. In an exemplary illustration, the second length ($L_1$ plus $L_2$) is greater than the first length ($L_1$). The selectively extensible member 110 may thereby allow manipulation of the base portion 106 within the structure 102, e.g., during installation. In one example, the base portion 106 defines an overall length $L_2$ that is between approximately 20 and 60 percent of an overall length $L_1+L_2+L_3$ of the structure 102.

Figure 1D:
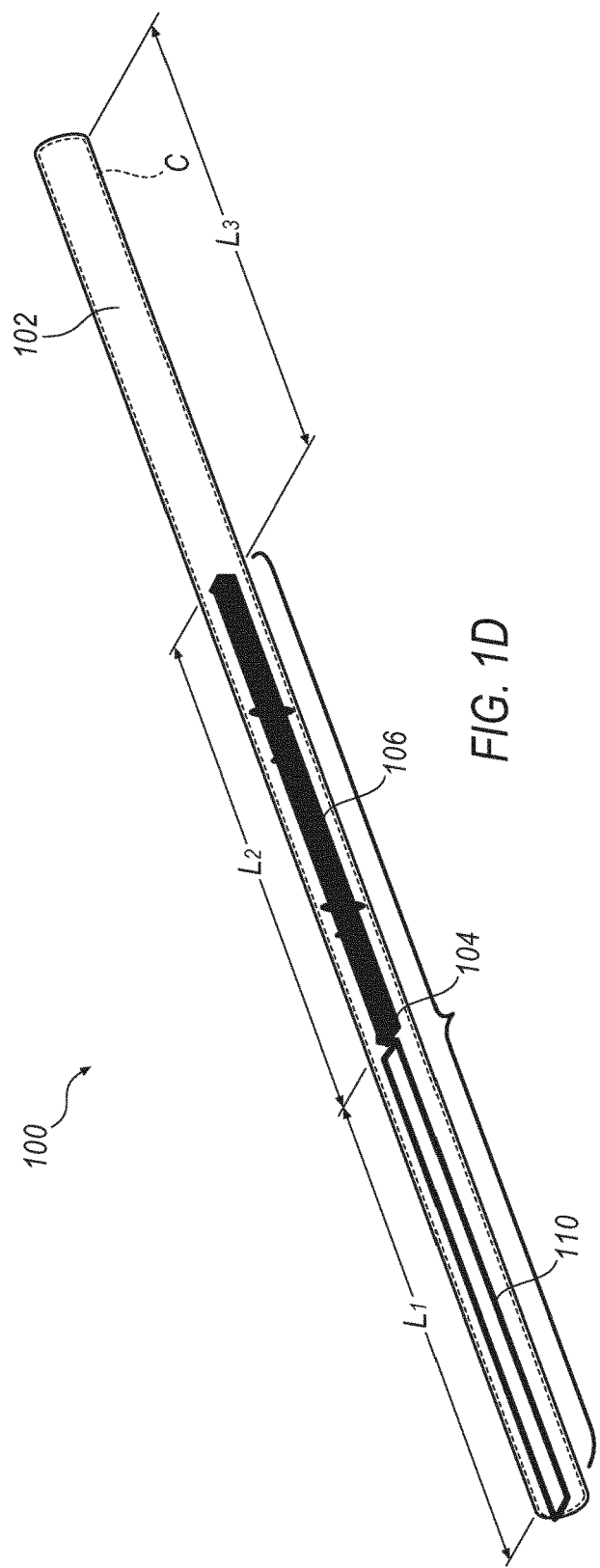
FIG. 1D is a perspective view of the reinforcing element of FIGS. 1A-1C after insertion into a structure, according to an exemplary illustration.

In some exemplary approaches, the member 110 may be generally configured to selectively extend away from the base portion 106 to facilitate positioning of the base portion 106 within the cavity C. For example, as noted above the cavity C may generally be elongated such that positioning of the base portion 106 may only be accomplished by manipulating the base member with the member 110 in an extended position. For example, as best seen in FIGS. 1B and 1C, and 1D, the base member 110 may be selectively manipulated such that it increases an overall length of the reinforcing element 104. The additional length of the reinforcing element 104 allows the base portion 106, including the bonding material 108 disposed thereon, to be more precisely positioned longitudinally within the cavity C of the structure 102. While the exemplary illustration shown in FIGS. 1B-1D generally illustrates a member 110 that is pivotable with respect to base portion 106 to facilitate selective lengthening of the reinforcing element 104, in other examples a member may be selectively removable from a base portion to facilitate selective lengthening, as will be described further below. Moreover, the base portion 106 may be positioned by manipulating the member 110 by hand, and/or without additional tools. After insertion of the base portion 106 into the structure 102, the member 110 may remain inside the structure 102.

Figure 2B:
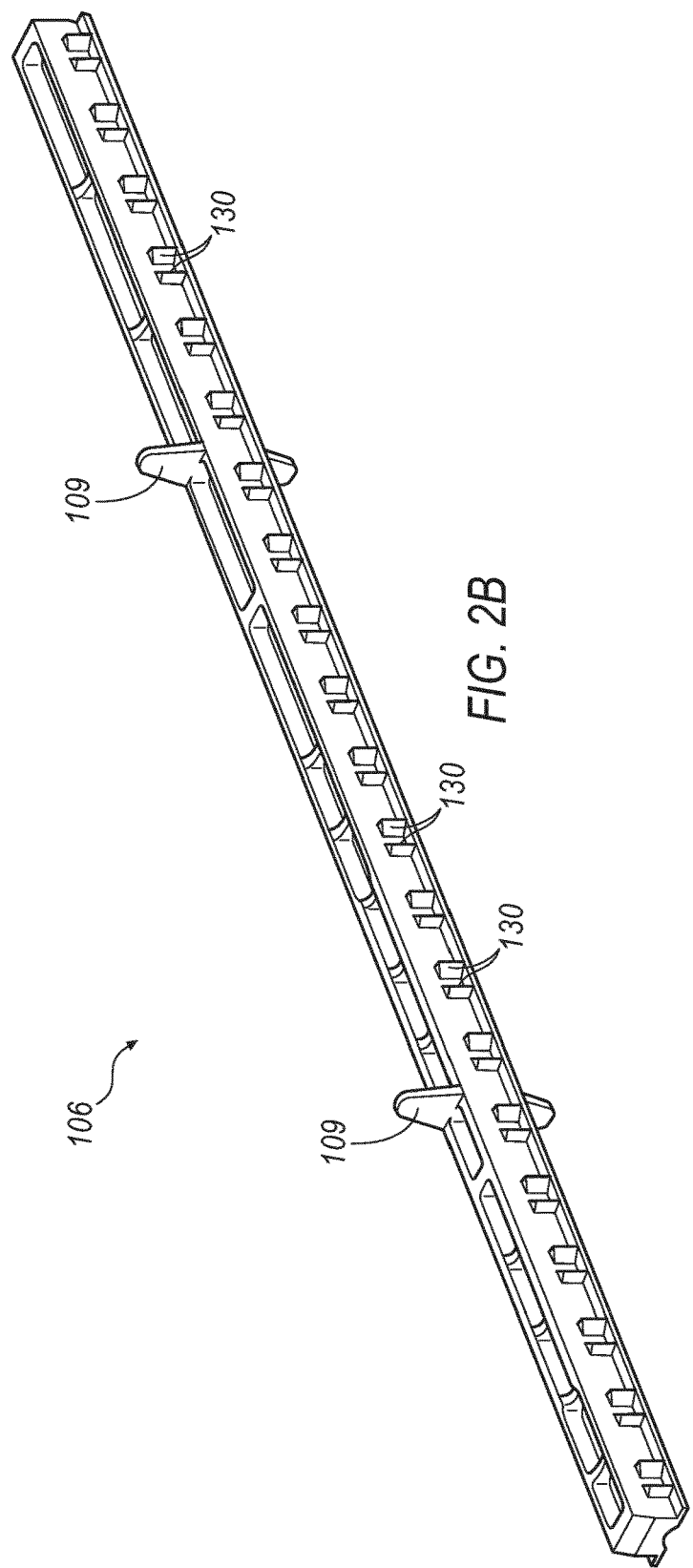
FIG. 2B is a perspective view of the exemplary base portion of FIG. 2A, with a bonding material removed, according to an exemplary illustration.

Turning now to FIGS. 2A and 2B, base portion 106 is shown in further detail. The exemplary base portion 106 may include a plurality of detents or notches 130 in the base portion 106. The detents 130 may generally be employed to retain bonding material 108 on the base portion 106.

The base portion 106 may also include one or more locating pins 109 extending away, e.g., laterally from the longitudinally extending base portion 106 as shown in FIGS. 2A and 2B. The locating pins 109 may be used to maintain a lateral position of the base portion 106 and/or reinforcing element 104 within structure 102. Additionally, the locating pins 109 may secure the base portion 106 to locating apertures 111 of structure 102 within the cavity C (see FIGS. 4A, 4B). For example, the locating pins 109 may positively engage corresponding features within the structure 102, e.g., locating apertures 111, thereby allowing the base portion 106 to be selectively locked in position within the cavity C of the structure 102. Accordingly, the base portion 106 may be secured within the cavity C. Subsequently, as will be described further below, the bonding material 108 may be expanded or cured, thereby generally permanently securing the base portion 106 within the cavity C and reinforcing the structure 102.

Figure 3C:
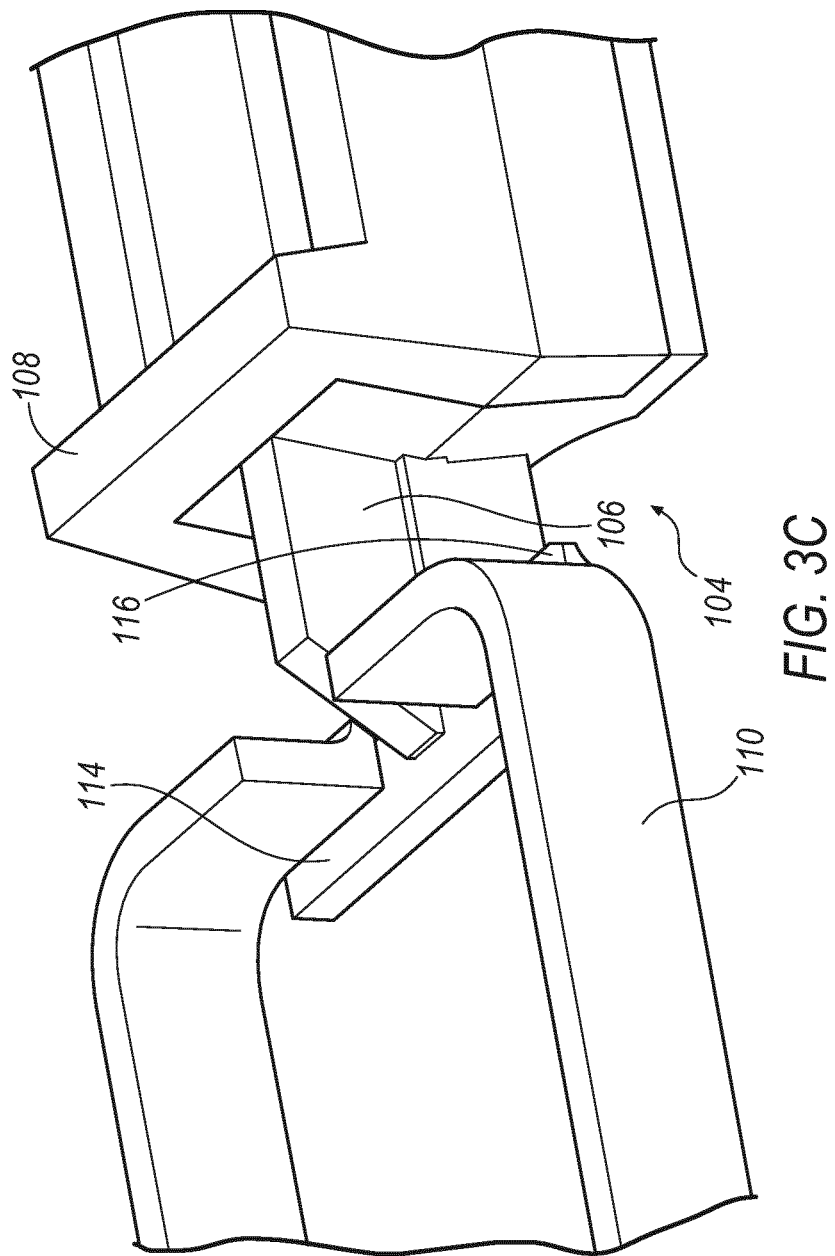
FIG. 3C is an enlarged perspective view of the exemplary hinged reinforcing element of FIGS. 3A and 3B with the member rotated away from the aligned position shown in FIG. 3A into a fully extended or second position, according to an exemplary illustration.

As noted above, the member 110 may be selectively extensible or manipulable with respect to the base portion 106 to allow the overall length of the reinforcing element 104 to be selectively increased. In one exemplary approach, the member 110 may be hinged with respect to the base portion 106. For example, as best seen in FIGS. 1A, 1B, 1C and 3A-3C, a hinge 112 may be provided that extends between the member 110 and the base portion 106, thereby allowing the member 110 to be pivoted or rotated with respect to the base portion 106 at an end thereof. As best seen in FIGS. 3A, 3B and 3C, the hinge 112 may comprise an integrally formed living hinge extending between end portion 116 of the member 110 and end portion 114 of the base portion 106. In one example, the base portion 106, hinge 112, and member 110 are integrally formed, e.g., in an injection molding process. In other exemplary illustrations, as will be described further below, the base portion 106 and member 110 may be formed separately.

As shown in FIG. 3A, the member 110 may be positioned in a first position such that the member 110 is generally aligned parallel to a longitudinal axis A-A (see FIGS. 4A and 4B) of the structure 102 into which the reinforcing element 104 is inserted. The hinge 112 may generally allow the member 110 to be pivoted to a second position, such that the member 110 forms an approximately 180° angle with respect to the base portion 106. The member 110 may be parallel to the base portion 106 when pivoted to the second position.

As noted above, structure 102 may generally be reinforced by the base portion 106 after expansion or curing of the bonding material 108. More specifically, the base portion 106 may generally be formed of any material that provides a structurally reinforcing effect with respect to the structure 102. Merely as examples, the base portion 106 may be formed of a plastic material such as nylon, a fibrous material, or a metallic material such as aluminum, steel or magnesium. The base portion 106 may be formed in any manner that is convenient, e.g., extrusion, stamping, or molding, merely as examples. Where the base portion 106 is extruded, the base portion 106 may generally define a predetermined cross-sectional profile along at least a portion of a length of the base portion 106, thereby facilitating forming the portion of the length of the base portion in an extrusion operation.

The bonding material 108 may include expandable foams such as structural foams, or adhesives or bonding agents that may also be expandable. In one exemplary illustration a bonding material 108 is an expandable foam having a compression strength between 1-100 MPa after expansion of the expandable support 100. In another exemplary illustration, the compression strength is between 2-25 MPa. Moreover, in one exemplary illustration the bonding material 108 has an expansion ratio of 10-400%. In yet another example, the expansion rate of the bonding material 108 is between 50-200%. Exemplary expandable materials may include, merely as examples, an expandable reinforcing material available under the name SikaReinforcer-911PB, SikaReinforcer-911NT2, SikaReinforcer-912, SikaReinforcer-940, SikaReinforcer-941, or SikaReinforcer-955. Other exemplary bonding materials include structural adhesives, for example a structural adhesive available under the name SikaPower-960, SikaPower-961, SikaPower-962, or SikaPower-963.

Exemplary bonding materials may be expandable or foamable, e.g., under the influence of heat. It is of course also possible to use other expandable materials, which may be activated by external heat sources or internal heat sources, such as by an exothermic reaction, for example.

In one exemplary illustration, a bonding material 108 or portions thereof are formed in an extrusion process. The bonding material 108 may also be generally non-tacky, thereby facilitating handling of the bonding material 108 and/or the reinforcing element 104 by hand. Accordingly, application and assembly of the reinforcing element 104 within the structure 102 is relatively easy and may be accomplished without specialized tools or machines.

In another exemplary illustration, the bonding material 108 include an expandable adhesive material or bonding agent, as will be described further below. For example, the bonding material may include at least one of an expandable material, an adhesive and a selectively activated bonding agent configured to generally secure the base portion 106 within the structure 102, at least semi-permanently. In some examples, a bonding material is configured to be activated by application of heat. Alternately, a bonding material may be activated by applying a hardener or other bonding agent or compound to the bonding material.

Turning now to FIGS. 5A, 5B, 6A, and 6B, additional base members 106 for an expandable reinforcer are illustrated, according to alternative exemplary illustrations. The base members 106' and 106" each employ a bonding agent or adhesive to adhere to a structure 102 receiving the base members 106. The bonding agent may generally secure the base members 106' and 106" to the structure 102, thereby reinforcing the structure 102.

Referring now to FIGS. 5A and 5B, an exemplary base portion 106' is illustrated. While a selectively moveable member, e.g., member 110 as described above, is not specifically shown attached to the base portion 106' in FIG. 5A, a member 110' as illustrated in FIG. 5B, or for that matter any other device may be employed to initially insert the base portion 106' within a structure 102'. Additionally a connector (not shown in FIGS. 5A and 5B) may be provided for selectively securing the member 110' temporarily to an end aperture 144 of the base member 106'.

Upon insertion of the base portion 106' into the structure 102', a bonding agent or adhesive 146 may be introduced into a central or interior portion 146 of the base portion 106' using a tube 140. More specifically, an adhesive may be supplied into a side aperture 142 and/or end aperture 144 of the base portion 106'. Adhesive may then flow through the central portion 146, and out radial passages 148, into cavity C'. Alternatively, a bonding agent or adhesive may be present within the base portion 106', which is subsequently forced through the radial passages 148 from the central portion 146 by fluid pressure, e.g., air, supplied by the member 110'. The adhesive may thus generally fill a gap between structure 102' and base portion 106', thereby generally securing the base portion 106' within the structure 102' and reinforcing the structure 102'.

Turning now to FIG. 6A, another exemplary base portion 106" is illustrated. A push member 150 is inserted into an end of the base portion 106", adjacent a central passage 146 of the base portion 106". In contrast to the hinged member 110 described above where the hinge 112 is integrally formed with a base portion 106 and member 110, the push member 150 may be selectively removable from the base portion 106". More specifically, the push member 150 may be formed as a separate component which is inserted into the base portion 106", e.g., just prior to assembly of the base portion 106" within the structure 102". The central passage 146 is generally pre-filled with an adhesive 160. The push member 150 may include an extrusion plate 190 disposed at an end thereof. As illustrated in FIG. 6A, the extrusion plate 190 may be a generally flat plate that encloses an end of the base portion 106", such that adhesive 160 is generally not permitted to escape the base member 160" when the extrusion plate is inserted into the base member 106". Moreover, upon positioning of the base portion 106", e.g., via the push member 150, the push member 150 may be moved further into the central passage 146, such that the extrusion plate 190 generally squeezes the adhesive 160 out of the base member 106" through a plurality of radially extending passages 148 and into cavity C. The adhesive 160 may thereby flow into a gap between the base portion 106" and the structure 102", thereby securing the base portion 106" to interior surface(s) of the structure 102".

Turning to FIG. 6B, the base portion 106" is illustrated with an alternative device for forcing adhesive 160 out into the cavity C to promote securement of the base portion 106" to the structure 102". More specifically, an expandable core material 152 is positioned generally centrally within the base portion 106". The core material 152 may be configured to expand, e.g., upon application of heat, within the generally closed central area of the base portion 106", thereby forcing at least a portion of adhesive 160 into cavity C via radial passages 148. The adhesive 160 may thereby generally fill a gap between the base portion 106" and the structure 102", thereby securing the base portion 106" to interior surface(s) of the structure 102" and reinforcing the structure 102".

Exemplary adhesives 160 may generally include any bonding agent or adhesive material that is convenient. Various exemplary adhesives 160 are described, merely as examples, in International Patent Publication No. WO 2008/077944 and corresponding U.S. Pat. Publication No. 2010/0092733, the contents of each being hereby expressly incorporated by reference in their entireties. Exemplary adhesives 160 may be adapted to the desired conditions. For example, desired mechanical properties can be selected specifically.

Moreover, there are little problems with aging of the adhesives 160, and there is generally no loss of properties in the course of transit, storage or installation.

In one exemplary illustration, adhesive 160 may include a reactive adhesive that cures or allows securement of a carrier after addition of a curing agent and/or heat. There are a very wide variety of systems that can be employed for the reactive adhesive. A reactive adhesive, in accordance with the temperatures which occur subsequently in the operation, can be selected such that sufficiently quick curing takes place to give the desired mechanical properties. If, for example, the structure 102 and/or reinforcement 104 passes through a standard paint drying oven at average temperatures of 165-180 degrees Celsius for about 30 minutes, then a typical structural 1K [one-component] epoxide-based structural adhesive may be utilized. In another example, average temperatures may be from 165-180 degrees Celsius, and may include temperatures from approximately 140 degrees Celsius to high temperatures of approximately 205 degrees Celsius. In another exemplary illustration, adhesive 160 includes a single-component heat-curable paste that generally maintains its shape up to 50 degrees Celsius, is generally flowable or squeezable at room temperature, and cures or hardens at temperatures typical of electro-coating and/or paint ovens associated, e.g., with vehicle assemblies. Further, the adhesive 160 may resist curing or reaction for a predetermined time, e.g., an "open time," to allow transport, preparation, and delivery to a final assembly location. In one exemplary illustration, adhesive 160 has an open time of at least 2 hours, and in some cases may be longer than three months. The adhesive 160 may also be solid and/or dry to the touch at temperatures less than approximately 40 degrees Celsius, becoming activated by heat, infra-red radiation, or chemical reaction with an activating agent, to form a flowable or squeezable paste prior to assembly. Adhesive 160 may also be covered with a protective film that is manually removed or thermally melted prior to final assembly.

It is therefore possible in each case to select a bonding material or adhesive 160 which corresponds to the conditions desired by the manufacturer. It is also possible to adapt the nature of the adhesive immediately to altered on-site production conditions without changing the carrier element. If, for example, the reinforcing part is to be installed at a higher temperature than initially planned, for example to simplify the production operation, an adhesive 160 is simply used which cures at the corresponding temperature.

An exemplary one-component reactive adhesive which can be used for the adhesive 160 is a storage-stable polymer composition which is characterized in that it comprises at least one resin A that enters into polymerization reactions, at least one curing agent B, more particularly a blocked curing agent, at least one additive D, and also, optionally, further components, with preferably at least one of the components A or B being present in a blocked form.

Figure 7:
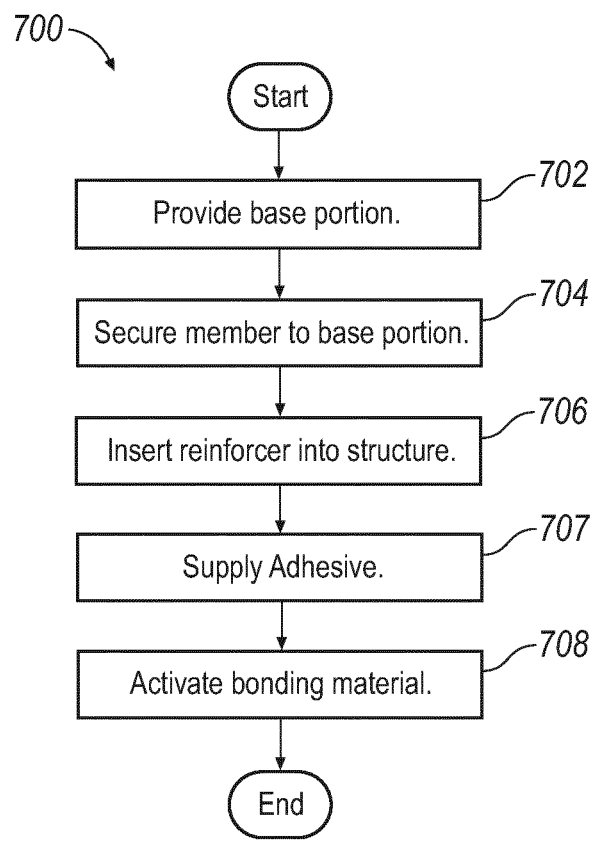
FIG. 7 is a process flow diagram for an exemplary method of making a reinforcing element, according to an exemplary illustration.

Turning now to FIG. 7, an exemplary process 700 of forming an reinforcing element, e.g., reinforcing element 104, is described. Process 700 may generally being at block 702, where a base portion is provided. For example, as described above a base portion 106 may be provided which includes an expandable material or adhesive applied thereon for securing the base portion 106 within a structure 102 to be reinforced. Process 700 may then proceed to block 704.

At block 704, the member may be secured to the base portion. For example, where a member 110 is formed integrally with a base portion 106, the member 110 and base portion 106 may be formed, e.g., in an extrusion or molding process, merely as examples. Alternatively, where a member is formed separately from the base portion 106, e.g., a push member 150, the push member 150 may be inserted into an end of the base portion 106 to facilitate installation within the structure 102.

Proceeding to block 706, the reinforcer may be inserted into the structure. For example, with the member 110 or push member 150 extending away from the base portion 106 to define an increased length, it may be possible to more precisely position the base portion 106 within the structure 102. Process 700 may then proceed to block 707.

At block 707, an adhesive may be supplied or pumped within the reinforcing element, as described above in some exemplary approaches. For example, in exemplary illustrations such as those described above where an adhesive is forced out of a base member 106' or 106" as in FIGS. 5A, 5B, 6A, and 6B, an adhesive 160 may be force outwards by fluid pressure supplied by a member 110', pushed outwards by a push member 150, or by an expandable core material 152.

Proceeding to block 708, a bonding material associated with the reinforcing element may be cured or expanded. For example, a bonding material 108 may be expanded or cured, or an adhesive 160 may be expanded or cured. Expansion or curing of a bonding material, e.g., bonding material 108 or adhesive 160, may thereby secure the reinforcing element 104 within a structure 102. More specifically, expansion of a bonding material may generally fill a gap between a base portion 106 and structure 102, thereby securing the base portion 106 to interior surfaces of the structure 102 and reinforcing the structure 102. Process 700 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A reinforcing element configured to be received within a longitudinally extending cavity defined by a structure, the reinforcing element comprising: a base portion having a bonding material applied thereon; and a member secured to and moveable with respect to the base portion, the member configured to selectively extend away from and be aligned in a longitudinal direction with the base portion when the reinforcing element is received within the cavity such that the reinforcing element defines a first length in the longitudinal direction when the member is in a first position with respect to the base portion, and a second length in the longitudinal direction when the member is in a second position extending away from and aligned in the longitudinal direction with the base portion, the second length being greater than the first length, wherein the member includes an extrusion plate received within a central passage of the base portion, the extrusion plate configured to force an adhesive through the central passage, where said adhesive was pre-deposited in said central passage, wherein the bonding material includes a structural adhesive, and wherein the structural adhesive is non-expandable.

2. The reinforcing element according to claim 1, further comprising a hinge securing the member to the base portion such that the member rotates about the base portion, wherein the hinge connects a first end of the member to an end of the base portion, such that the second length is approximately equal to a combined length of the member and the base portion.

3. The reinforcing element according to claim 2, wherein the member is integrally formed with the hinge and the base portion.

4. The reinforcing element according to claim 1, wherein at least one of the member and the base portion is formed of a plastic material.

5. The reinforcing element of according to claim 1, wherein the member is selectively removable from the base portion.

6. The reinforcing element according to claim 1, wherein the base portion includes at least one passageway extending through an outer wall of the base portion.

7. The reinforcing element according to claim 1, wherein the base portion is formed of one of a plastic material and a metal material.

8. The reinforcing element according to claim 1, wherein the base portion is extruded such that the base portion defines a predetermined cross-sectional profile along at least a portion of a length of the base portion.

9. The reinforcing element of one of the according to claim 1, wherein the base portion defines a first length, the first length being between approximately 20 percent and 60 percent of a second length defined by the structure.

10. The reinforcing element according to claim 1, further comprising the structure defining the cavity.

11. A method of making a reinforcing element configured to be received within a longitudinally extending cavity defined by a structure, the method comprising: providing a base portion having a bonding material applied thereon; and securing a member to the base portion in manner such that the member is moveable with respect to the base portion, the member configured to selectively extend away from and be aligned in a longitudinal direction with the base portion when the reinforcing element is received within the cavity such that the reinforcing element defines a first length in the longitudinal direction when the member is in a first position with respect to the base portion, and a second length in the longitudinal direction when the member is in a second position extending away from and be aligned in the longitudinal direction with the base portion, the second length being greater than the first length, wherein the member includes an extrusion plate received within a central passage of the base portion, the extrusion plate configured to force an adhesive through the central passage, where said adhesive was pre-deposited in said central passage, wherein the bonding material includes a structural adhesive, and wherein the structural adhesive is non-expandable.

12. The method according to claim 11, further comprising inserting the reinforcing element into the longitudinally extending cavity of the structure.

* * * * *